May 15, 1962 G. MARANCA 3,034,900
PROCESS TO INCREASE THE CELLULAR PERMEABILITY
OF VEGETAL MATTERS
Filed June 26, 1958
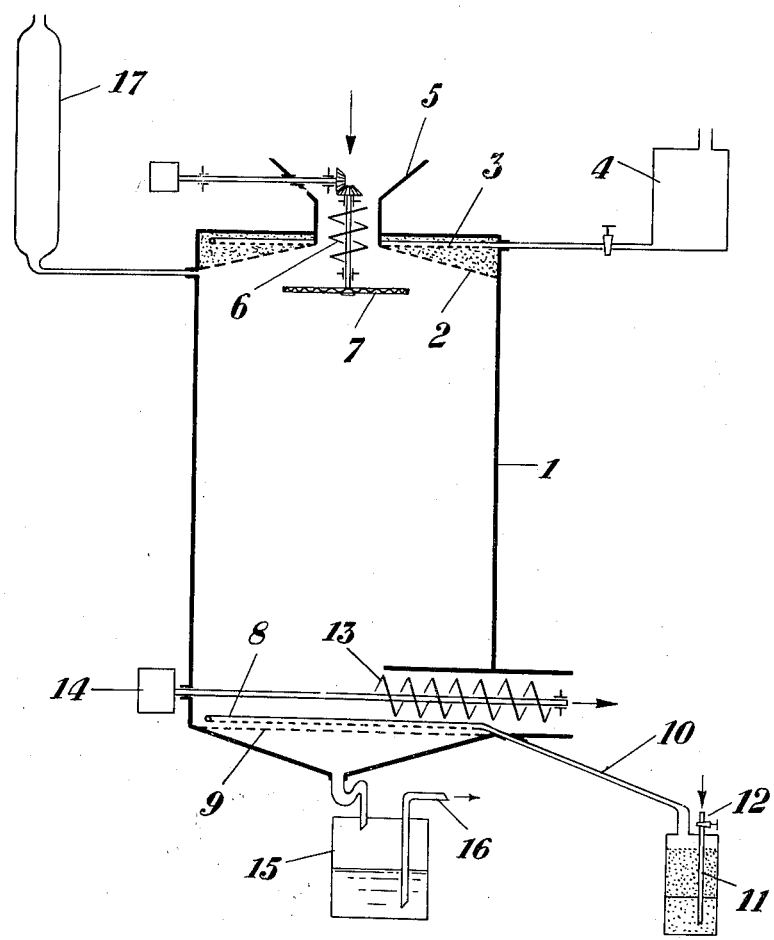
Gustavo MARANCA
INVENTOR.
BY: Wenderoth, Lind & Ponack
Attys 3,034,900
PROCESS TO INCREASE THE CELLULAR
PERMEABILITY OF VEGETAL MATTERS
Gustavo Maranca, Nocera Inferiore (Salerno), Italy
Filed June 26, 1958, Ser. No. 745,139
Claims priority, application Italy July 10, 1957
7 Claims. (Cl. 99—165)

The present invention relates to a process to increase the cellular permeability of vegetal matters. More particularly, according to the present invention, the cellular permeability of vegetal matters is increased by a treatment with organic solvents in liquid or vapor state. Said increased cellular permeability allows the material to be more easily dried, and improves the extraction of the lipo-soluble and water-soluble matters therefrom.

It is known that many organic solvents act on the live vegetal cell producing a block of the vital functions and, should the action of said solvents be prosecuted, even death of the cell.

According to this invention, considering that the action of said solvents, first biostatic and finally lethal causes as final effect the cellular membrane to lose its so-called semi-permeability, it is hereby proposed as a practical method to process vegetal products in a manner avoiding this drawback, in order to render easy the extraction of the cellular juices, as well as of the lipo-soluble materials from the extraction residues.

The process according to this invention may be practiced by using the organic solvents in their vapour state, use being made of the absolute vapour of the solvent, or said solvent vapour may be admixed with air.

More particularly, in case of processing with absolute solvent vapours, a sealable cylindrical chamber or vessel is filled with the vegetal substances to be processed, then in the lower portion of said vessel a pad is arranged, impregnated with the selected liquid solvent, the air is slowly drawn from the upper end so that gradually the solvent vapours take the place of the air.

In the case of the processing with solvent vapours admixed with air, the chamber is filled like in the processing case of the preceding paragraph. At the bottom of the chamber a pad is arranged imbibed with the liquid solvent, the solvent vapours at the operating temperature are permitted to form a mixture with the air contained within the vessel due to the natural vapour pressure of the solvent.

Organic agents for increasing the cellular permeability of vegetable materials suitable for the use according to this invention are ethylene trichloride, chloroform and benzene.

From the physical standpoint, said solvents may be used in form of vapours and mixtures of vapours with inert gases or air, emulsions, with or without the intervention of surface active agents.

The material to be processed, according to the process of the present invention, includes vegetal materials of any kind, for instance leaves, fruits, grass, flowers, roots, wood and agricultural products generally.

In order to better illustrate this invention, some preferred embodiment examples thereof will be hereinafter described.

EXAMPLE A

*Processing of Green Vegetables*

In a 300 liter cylinder having a foraminous double bottom, 100 kg. of leaves or vegetables, or residues of the preparation for the horticultural exportation are arranged under a slight pressure. In the space comprised between the lower bottom and the foraminous bottom, a pad impregnated with 100 g. of chloroform is arranged. The cover is then closed and the air is drawn by a suction pump, from the top portion, prosecuting this operation through two hours.

At the end of this period, the vegetal mass is taken out and is submitted to a pressing step in a usual press. Thus, 80 kg. of cellular juice are obtained which may be destined to the concentration under reduced pressure to obtain food vegetal extracts. The edibility of this juice is unaffected since the solvent used as cellular permeability-increasing agent remains in the extraction residue into which it has penetrated during the preceding treatment. Any possible traces of the agent in the liquid phase, on the other hand, would be removed by evaporation by the subsequent concentration operations. The residual cake of the pressing step (20 kg.) may be subjected to the extraction of chlorophyll, since the latter is left unaltered by the aforesaid treatments.

EXAMPLE B

*Yellow Carrot*

In a cylinder of the type as used in the Example A are arranged 200 kg. of entire yellow carrots, and the pad is impregnated with 200 g. of chloroform. The processing is carried out as in Example A, and the action of the chloroform is prosecuted through 8 hours. At the end of this period, the carrots are submitted to a vigorous pressing step, whereby 80 kg. of juice are pressed out, said juice being apt to be destined to the production of food vegetal extracts. Also in this case, as in the preceding one, no health harmful product is obtained, since the chloroform remains in the residue, into which it has penetrated.

The 40 kg. of the residual cake from the pressing step, having an orange yellow color, may be destined to carotene extraction; the carotene is not altered since no air is present.

EXAMPLE C

*Beets*

In a set of diffusers of the usual diffusion plants for the sugar extraction from the sugar beets, and containing the beets in the usual tape state, said beets having been submitted to no thermal treatment, benzene saturated water is admitted. The saturation is carried out by a vigorous stirring of the water with a benzene excess. By such a treatment, about 1 part of benzene is dissolved in 1000 parts of water. Operating according to this example, the sugar diffusion is remarkably promoted, with a greater yield. Also in the case of the beets, the treatments according to the Examples A and B may be used.

By the "narcotic" treatment as hereinbefore described, the "semipermeability" is destroyed determining thus an actual permeability.

When the "narcosis" is prosecuted, a "plasmolysis" occurs quite similar to that obtained by the scorching step (for instance in the processing of the sugar beet) with the sole difference that in the scorching plasmolysis some protein components are coagulated, while the narcosis plasmolysis originates no appreciable coagulations, whereby some protides pass in the cellular juice in solution state.

The biostatic action extends to the micro-organisms of every kind which contaminate the raw material whereby any enzymatic action depending upon the biological activity of said micro-organisms is equally attenuated.

(This action is to be particularly emphasized in that it has proved to be a very important advantage in the possible long treatments to which the raw materials are submitted.)

The examples as hereinbefore set forth, provide for the use of a narcosis chamber where the narcotic vapours are evolved by a bottom arranged pad. As in a "narcosis" with chloroform preparatory to a surgical operation, the object of the "narcosis" comes into contact with the vapors of the "narcotic" agent, i.e. the agent for increasing the cellular permeability of the treated vegetable material in the process according to the invention. According to a further embodiment, the supply pad for the narcotic vapour is arranged in the top portion, i.e. at the roof of the chamber, forming thus automatically a downwards moving stream, due to the high specific gravity of the used gas, which takes up the whole available space, replacing the air or any other previously present gas, and these coming into direct contact with the treated vegetable material.

In the examples hereinbefore set out, the processing of entire vegetables has been discussed. Although this is the ideal condition, practically the narcosis necessary for a complete plasmolysis would be too long, except for particular cases, to be suitably commercially adopted.

With a view to the treatments satisfying the industrial requirements, the vegetables to be processed are suitably divided into different classes:

(A) Vegetables having a large active surface, as for instance pod-like fruits with a mesocarp a few mm. thick (for instance pepper pod chillies) pods, leaves of any kind plants, flowers, saccharomyces and other fungi. These vegetables have to be treated in their entire state. Sufficient narcosis 8 hours.

(B) Vegetables having a small active surface with respect to their weight. For instance roots, tap-roots, tubers, bulbs and the like. These vegetables are suitably minced before being submitted to the narcosis, for instance cut into chips, or sliced, or otherwise shredded, to increase the specific active surface. The sufficient narcosis time is from about 2 to about 8 hours.

(C) Vegetables which although having a little specific surface would suffer a noxious effect due to mincing, by the action either of enzymes coming from the cells or of the atmospheric air. These vegetables are treated in their entire state, for long time (24–48 hours) however obtaining juices having totally different features from those of common juices obtained after mincing and grinding (for instance apples, pears, grapes).

The experience proved that it is not feasible of augmenting beyond certain limits the capacity of the narcosis chambers if an effective operation is to be obtained.

For the industrial processing a narcosis chamber has been designed as diagrammatically shown in the attached drawing by way of example.

The numeral reference 1 denotes a cylindrical tower made of metal sheet (diameter 3 m., height of the cylindrical part 4.50 m.).

The frusto-conical top 2 is encompassed by a chamber where moderately compressed hydrophile cotton is arranged to form a pad. A foraminous tube 3 having a diameter of 10 mm. is ring-like arranged in the hydrophile cotton and communicated with the reservoir 4 of the narcotic liquid.

The loading mouth 5, provided with a screw feeder 6, receives directly the chips from the shredding devices which are directly mounted on said mouth, or elsewhere. In this instance the chips reach said mouth by means of conveyors or the like.

The axis of the feeder 6 ends by a spider 7 which acts as a distributor of the chips through the area of the chamber.

A tube 8 having a diameter of about 20 mm. is ring-like arranged on the foraminous bottom 9 and is provided with holes only in its lower portion in order to prevent the juice from entering thereinto. Said tube 8 communicates through the tube 10 with an apparatus 11 to supply a narcotic saturated inert gas. This apparatus is a metal vessel almost filled with hydrophile cotton, containing up to a fourth of its height the narcotic liquid, provided with the pipe 12 for the supply of the inert gas, for instance nitrogen, coming from a bottle or from a suitable generating apparatus.

The inert gas passing through the porous mass supplies said gas saturated with narcotic vapours, when desired. A helical extractor 13 driven by a motor 14 unloads the unit. The possible produced juice is collected in the reservoir 15 by siphon arranged in the bottom portion, and may be drawn through the duct 16, to be conveyed to the subsequent processing.

The chamber 17 is an exhaust means for the narcotic vapour saturated gas, and includes an adsorber of activated carbon or other active substance to eventually recover the adsorbed narcotic.

As the narcosis starts just at the moment of the loading step and is prosecuted during the unloading step, by making the load capacity equal to the unloading capacity, and providing between the treatments an intervening time for instance of one hour, for a working performance of 10,000 kg./hour, as many chambers will be necessary as many are the hours necessary for the treatment+1 (for instance for one hour 2 chambers, for two hours 3 chambers, for 8 and 9 chambers and so on). By way of example some treatments will be hereinafter described.

TREATMENT OF THE SUGAR BEET

The generally used treatment consists in submitting the sliced beet to the action first of very hot water and then of hot water. The first treatment has the purpose of breaking the cellular semipermeability (plasmolysis).

In the meantime the coagulation of the coagulable protein is obtained, the micro-organisms are killed, and the enzymes are inactivated to a greater or minor extent (85–95° C.)

In the contrary, noxious effects are the solubilisation of pectic materials and the peptization of protein materials with the consequent contamination of the juices to be submitted to sugar extraction. This is the reason why a tendency exists to lower the treatment temperature and to diminish the treatment duration.

Then a counter-current washing is carried out, in hot water at about 75° C. The use of the hot water would not be strictly necessary, in that the diffusion rate, which is directly proportional to the absolute temperature and inversely proportional to the viscosity, at parity of other conditions, is not very important. However, having to arrange for a complete equipment for the first treatment of plasmolysis, also the hot diffusion is carried out.

Strictly speaking, it would be possible to increase the diffusion rate by acting on the third parameter i.e. on the diffusion area, and therefore diminishing the thickness of the slices.

However this thickness is practically limited to not less than 3 mm., as the plasmolysis treatment causes the tissues to be softened, and for too thin slices such a dense aggregation of the matter would occur in the apparatus, as to render almost impossible an adequate juice circulation to obtain a good diffusion. Furthermore the aforesaid drawbacks concerning the solubilization of the pectic matters and the peptization of proteic matters would be enhanced.

Within the scope of this invention, a process as follows is proposed:

3 narcosis chambers as above described are arranged, each having the capacity of 20 cubic meters.

The beets, prepared according to the usual practice are reduced to 1 mm. thick chips, in a common shredding machine. The chips, by means of hoists, conveyors or the like, are directly loaded into the chambers No. 1, No. 2, No. 3, so that one hour is consumed for filling each 20 cubic meter chamber, containing 10,000 kg. of chips. Since the start of the operation, the pad will be impregnated or supplied with ethylene trichloride. This narcotic is preferred due to its low cost, at parity of plasmolytic power.

When also the chamber 2 has been filled, the material at the bottom of the chamber No. 1 will have been submitted to 2 hours of narcosis and is ready to be treated.

The material will be extracted consuming another hour and so on.

The narcotized material will then be introduced into the diffusion plant. A conventional diffusion equipment can be used, and in said equipment all of the heat supply and heat removal members may be dispensed with, using fresh water at ordinary temperature.

It has been practically found that the diffusion rate by this cold method, with 1 mm. thick chips, is equal and even greater to that obtained in a similar hot plant, using 3 mm. thick slices.

In other words at parity of equipment, the working performance is equal.

The obtained juices (raw juice) have the same sugar density as those obtained by a conventional processing. These juices have a slightly higher content of protein matters, requiring a greater amount of lime, of 100 g. CaO per 100 kg. of beets in the first "pre-defecation" treatment.

On the other hand, the pre-defecation is remarkably easier than for the liquids of the hot diffusion process due to the absence of pectic matters and generally of peptized matters.

Due to the presence of traces of narcotic dissolved in the juices, these juices are submitted to no alteration if kept safe against the atmosphere or in narcotic vapour atmosphere. The chips, squeezed and dried according to the common practice, are perfectly suitable for cattle feeding, and better than the common "pulps" from the hot extraction are suitable for the pectins and cellulose production, as they have been submitted to no modifying alteration due to heat effect.

Some variations to this process consist in alkalinizing the diffusion water by slight additions of lime, or in carrying out simultaneously the narcosis and diffusion steps. It is also possible to press the narcotized slices.

TREATMENT OF THE YELLOW CARROTS FOR THE EXTRACTION OF JUICE AND OF CAROTENE

In the known methods for the extraction of carotene, recourse is had mainly to two systems:

(1) After the carrots have been reduced to a slurry, this slurry or the carotene emulsion obtained thereby is treated with agents forming a carotene adsorbing precipitate.

When the precipitate has been squeezed and dried, the latter is submitted to extraction of the eminently lipophilic carotene by means of solvents.

(2) The sliced and dried carrots are treated with solvents.

In both these methods it is impossible to avoid a contact with air so that most of the carotene is destroyed.

In a preferred process according to this invention, 10,000 kg. of yellow carrots, after washing, are sliced by a slicing machine into 1 cm. thick slices, and introduced as soon as they are produced into a narcosis chamber of the described type provided with a narcotizing plant of the chloroform type. Before starting the operation, the air is removed by an inert gas stream, preferably nitrogen, during the filling step.

After the chamber has been filled with sliced carrots, said carrots are left under the narcotic action through 24 hours.

After this period, the slices are removed and submitted to a strong pressing action, in a hydraulic press provided with suitable filtering members, for instance filtering discs.

Thus, 9000 kg. of cellular juice having 6–8% of dry residue are obtained, and 1000 kg. of cake.

The juice, submitted to concentration in concentrators under reduced pressure up to 1/10 of the weight, yields 9000 kg. of vegetal extract suitable for food making.

This juice contains no trace of solvents or combinations thereof. The natural squeezed juice, wherefrom the narcotic traces have been removed by a short cold or heat treatment under vacuum is perfectly suitable to the alcoholic fermentation and even more to supply elements for the culture of yeasts, or other fungi for industrial uses.

The 1000 kg. of cake contain all the carotene initially contained in the 10,000 kg. of carrots, in most part adsorbed (together with other natural lipoid components of the tissues of this root and the chloroform absorbed during the narcotic treatment) in the tissues which behave thus as a support.

The extraction from this cake of the carotene-rich lipoids therein contained and concentrated is easily carried out by common solvents.

Therefore this process allows the cellular juice to be integrally utilized with a minimum expense, and this is a decisive superiority to the economical purposes. Furthermore, as most of the losses of the carotenoids due to drying are avoided, the yield of the process now described is very high.

TREATMENT OF GREEN LEAVES FOR THE EXTRACTION OF JUICES, CAROTENOIDS AND CHLOROPHYLL

In the hitherto known processes, at least one half of the carotenoids originally contained in the vegetable are destroyed by oxidation, while nearly one half of the chlorophyll is degraded to less valuable compounds. According to this invention the process is carried out as follows:

10,000 kg. of said fresh vegetables are introduced in a narcosis chamber with a chloroform supplied pad. After 24 hours said vegetables are pressed in a hydraulic press provided with suitable filtering members.

Thus an amount of 8000 kg. of juice is extracted having 4–5% dry residue.

The cake (2000 kg. for 10,000 kg. of initial vegetable) can be very easily dried under vacuum, either in its compressed state or after slackening. In any case the drying will be extremely rapid with respect to the raw material, due to the loss of 8000 kg. of juice (i.e. 7500 kg. of water) and due to the permeability produced by the narcoses promoting the capillary phenomena.

The so dried cake submitted to an extraction step with petroleum ether or other solvent in a conventional apparatus gives a carotenoids solution, wherefrom the carotene can be extracted by ordinary methods.

If carotenoids and chlorophyll are to be obtained, the cake (2000 kg.) is treated in the usual apparatus with 3500 kg. of acetone, as first extraction.

It has been proved that with the water contained in the cake the acetone-water solution is formed in the suitable ratio for the extraction of the two groups (carotenoid, chlorophyll).

The following extraction will be effected with more or less aqueous acetone in the usual way (enriched with 85% of acetone).

From the acetone solution the carotenoids and the chlorophyll will be extracted by fractional extraction according to known methods.

TREATMENT OF FRUITS

For the juice extraction, optimum yields are obtained by submitting the fruits, for instance entire apples to narcosis with ethylene trichloride through 40 hours, or said apples are cut in pieces of about half a fruit and submitted to narcosis through 20 hours. The fruits in this state are submitted to pressing in a hydraulic press provided with suitable filters and by a gradual pressure, up to 87% of juice is obtained.

This juice, when compared with ordinary juice proves to contain the same amount of sugars and acids and pectic materials in soluble state and heat stable, giving by concentration perfectly clear and stable jellies. This is due to the absence of enzymes and to the cellular integrity preserved during the process.

The apple cake (about 13% of the initial fruits) may be destined, after drying, to cattle feeding or to pectins extraction. In a similar way pears, figs, and the like may be treated.

TREATMENT OF THE PEELS OF ORANGES, LEMONS, CITRUS AND THE LIKE

In the industrial working plants for these fruits, particularly oranges, for each 100 kg. of fruits, about 50 kg. of peels are obtained, amounting thus to 54–55%.

The greatest difficulty is due to the special formation of the peel tissue, which is easily submitted to deep alterations, said tissue swelling when water impregnated and being hardly pressed.

Furthermore in the mechanical extraction operations of the essential oil, the yield is extremely low.

Optimum results have been obtained according to this invention, with the treatment as follows:

10,000 kg. of peels are put in a narcosis chamber of the described type, with a pad supplied with either ethylene trichloride, or chloroform, and are left therein through 10 hours.

The peels extracted after this term show their tissues impregnated with cellular juice due to the effect of the plasmolysis to which said tissues have been submitted by the narcosis.

The essence containing utricles are surrounded by the tissue, now lipophobe due to this impregnation. By a vigorous pressing step, from 10,000 kg. of peels, 5000 kg. of juice are obtained having a 12° Brix density, containing emulsified oil which, in its most part, is floating.

This oil has characteristics very similar to those of the hand squeezed oil, in that it has been submitted to no relevant chemical action; a remarkable yield is obtained, with respect to the initial content.

It is prepared by centrifugation. The remaining juice, at 12° Brix, has a pH not higher than 4.

It contains only small amounts of pectic matters and no heterosides. It contains various oses and polyoses and is suitable to all of the uses of the similar juices, directly or after concentration.

The 5000 kg. of pressed peels can be dried for cattle feeding or can be destined to pectin extraction.

If said products are destined to the extraction of heterosides a usual lime treatment may be carried out, with the advantage that a material is treated from which ⅔ of the water soluble matters have been removed.

By such a processing the precipitation of the heterosides is greatly facilitated and the residual cake from the pressing step after the lime treatment is reduced to about 2500 kg. with about 65% moisture, in comparison with a cake obtained by the ordinary methods which contains about 85% moisture.

TREATMENT OF FUNGI

In a 2000 liter cylindrical vessel, having a closed concave bottom, a loading mouth and an unloading mouth, a mechanical stirrer, and a mouth in its roof where a chloroform impregnated pad is arranged, and a gas vent tube, 1000 kg. of compressed yeast are arranged.

After two hours, with no intervention of the stirrer, the mass appears cracked in all directions. After 4 hours the mass is soft, slightly swollen due to the $CO_2$ evolved by enzymatic actions. The stirrer is then slowly started and one kg. of liquid chloroform is introduced into the mass since the vapours could not be sufficient to strike the cells now drowned in their juice.

After about other two hours, i.e. at the 6th hour from the beginning, the mass is transformed into a dense milk. This mass is poured in a suitable reservoir wherefrom it is passed in a rotary filter provided with a suitable cloth.

Under good filtering conditions, 800 kg. of cellular mass will be obtained, light brown coloured, pH 5.5–6, dry residue 20%, with genuine taste and odour of yeast. This liquid, concentrated under reduced pressure, or left cooling, deposits abundant solid matters, in most part in crystalline state.

The cellular juice may be treated according to the customary treatments for the extraction of amino-acids, nucleinic acids, and other protides and derivatives thereof. Finally in all cases where soluble components of the cellular juice, having an industrial interest, for instance soluble vitamins, alkaloids, glucosides etc., are contained in very little amounts and are submitted to easy alteration due to oxidisation or enzymatic decomposition, the extraction from the fresh vegetable by a squeezing step following the narcosis, offers remarkable advantages, among which the possibility of obtaining concentrated solutions unaffected by the aforesaid noxious effects.

While some specific embodiments of the invention have been shown and described to illustrate the application of the invention principles, it will be understood that the invention may be embodied otherwise without departing from such principles.

I claim:

1. In a process for the extraction of lipo-soluble and water-soluble matters from fresh vegetable material, the improvement, consisting essentially of the steps, prior to the extraction, of
   (1) treating fresh vegetable material at room temperature with vapors of an organic permeability-increasing agent selected from the group consisting of ethylene trichloride, chloroform and benzene, and maintaining a vapor pressure of the agent in the atmosphere above the treated material, whereby the vapors of the agent contact the material, for a time sufficient to ensure penetration thereof by the agent, thereby increasing the permeability of the cellular juice through the solid phase in the material, and
   (2) separating the so treated material into a liquid phase comprising the cellular juice containing the hydrosoluble substances from the material and the solid phase consisting essentially of a cake of increased cellular permeability and containing the insoluble and lipo-soluble substances of the material and the permeability increasing agent.

2. In a process for the extraction of lipo-soluble and water-soluble matters from fresh vegetable material, the improvement consisting essentially of the steps, prior to the extraction, of
   (1) treating fresh vegetable material at room temperature with vapors of an organic permeability-increasing agent selected from the group consisting of ethylene trichloride, chloroform and benzene and maintaining a vapor pressure of the agent in the atmosphere above the treated material, whereby the vapors of the agent contact the material, for a time sufficient to ensure penetration thereof by the agent, thereby increasing the permeability of the cellular juice through the solid phase in the material, and
   (2) pressing the so treated material so that a liquid phase is pressed out of the residual solid phase of said material, and separating the liquid phase comprising the cellular juice containing the hydrosoluble substances from the material and the solid phase consisting essentially of a cake of increased cellular permeability and containing the insoluble and lipo-soluble substances of the material and the permeability increasing agent.

3. In a process for the extraction of lipo-soluble and water-soluble matters from fresh vegetable material, the improvement consisting essentially of the steps of
   (1) treating fresh vegetable material at room temperature with vapors of an organic permeability-increasing agent selected from the group consisting of ethylene trichloride, chloroform and benzene and maintaining a vapor pressure of the agent in the atmosphere above the treated material, whereby the vapors of the agent contact the material, for a time sufficient to ensure penetration thereof by the agent, thereby increasing the permeability of the cellular juice through the solid phase in the material, (2) pressing the so treated material so that a liquid phase is pressed out of the residual solid phase of said material, and separating the liquid phase comprising the cellular juice containing the hydrosoluble substances from the material and the solid phase consisting essentially of a cake of increased cellular permeability and containing the insoluble and liposoluble substances of the material and the permeability increasing agent, (3) submitting said cake to drying under vacuum, (4) submitting the dried produce to organic solvent extraction and (5) concentrating said liquid phase.

4. In a process for the extraction of lipo-soluble and water-soluble matters from fresh vegetable material, the improvement, consisting essentially of the steps, prior to the extraction, of (1) introducing fresh vegetable material at room temperature into a receiver provided with an upper inlet and a lower outlet, (2) locating in a position adjacent to the inlet a pad soaked with an organic permeability-increasing agent selected from the group consisting of ethylene trichloride, chloroform and benzene, (3) leaving said vegetable material under the action of the vapors of said organic agent, emanating from said pad, at room temperature, for a period of from 2 to 48 hours, whereby the vapors of the agent penetrate into the vegetable material and increase the permeability of the cellular juice therein through the solid phase thereof, and (4) separating the so treated material into a liquid phase comprising the cellular juice containing the hydrosoluble substances from the material and the solid phase consisting essentially of a cake of increased cellular permeability and containing the insoluble and lipo-soluble substances of the material and the permeability-increasing agent.

5. The improvement according to claim 1 wherein the vapors of the organic solvent are used in admixture with a gas inert with regard to said solvent vapors.

6. The improvement according to claim 3, wherein the concentration of the liquid phase is carried out under vacuum.

7. The improvement according to claim 3, wherein the concentration of the said liquid phase is carried out at atmospheric pressure.

References Cited in the file of this patent

UNITED STATES PATENTS

| 950,950 | Oehme | Mar. 1, 1910 |
| 1,141,458 | Gore | June 1, 1915 |
| 1,840,798 | Tressler | Jan. 12, 1932 |

FOREIGN PATENTS

| 612 of 1906 | Great Britain | Mar. 1, 1906 |